United States Patent [19]

Arlt et al.

[11] 4,369,291

[45] Jan. 18, 1983

[54] POLYENE/α-OLEFIN COPOLYMERS

[75] Inventors: Klaus-Peter Arlt, Senden Muenster; Ulrich Grigo; Rudolf Binsack, both of Krefeld, all of Fed. Rep. of Germany

[73] Assignee: Bayer Aktiengesellschaft, Leverkusen, Fed. Rep. of Germany

[21] Appl. No.: 289,389

[22] Filed: Aug. 3, 1981

Related U.S. Application Data

[63] Continuation-in-part of Ser. No. 142,899, Apr. 23, 1980, abandoned.

[30] Foreign Application Priority Data

Apr. 28, 1979 [DE] Fed. Rep. of Germany ....... 2917403
Apr. 18, 1980 [EP] European Pat. Off. ...... 80 102 093.4
Apr. 25, 1980 [JP] Japan .................. 55-54407

[51] Int. Cl.³ .......................................... C08F 279/02
[52] U.S. Cl. ................................... 525/247; 525/232; 525/249; 525/315; 525/316; 528/497
[58] Field of Search ......................................... 525/247

[56] References Cited

U.S. PATENT DOCUMENTS 3,494,983  2/1970  Diem ................................. 525/247
3,953,542  4/1976  Halasa et al. ...................... 525/247

FOREIGN PATENT DOCUMENTS 2133353  4/1971  France .

Primary Examiner—Stanford M. Levin
Attorney, Agent, or Firm—Connolly and Hutz

[57] ABSTRACT

Copolymers or graft copolymers of from 5 to 95% by weight of α-olefins corresponding to the following general formula (A):

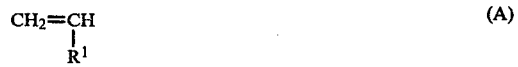

$$CH_2=CH \atop | \atop R^1 \qquad (A)$$

wherein $R^1$ represents alkyl having from 1 to 16 carbon atoms or phenyl; and from 5 to 95% by weight of straight-chain, branch-chain or crosslinked 1,4-polyenes, and a process for the preparation of such polymers, wherein one or more α-olefins (A) are reacted with a solid catalytic complex based on $TiCl_3$ and aluminum compounds corresponding to the following general formula (C):

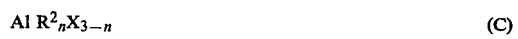

$$Al\ R^2{}_n X_{3-n} \qquad (C)$$

wherein $R^2$ represents $C_1$–$C_{18}$ alkyl; X represents halogen, preferably chlorine; and $0 < n \leq 3$; in the presence of a solution of polyene (B) in an inert solvent or in the presence of a gel of polyene (B) swelled in an inert solvent, and the final linkage between component (A) and component (B) is produced at the end of polymerization by the addition of a dihalogen aluminum alkylene corresponding to the following general formula (D):

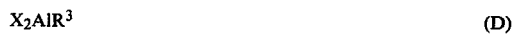

$$X_2AlR^3 \qquad (D)$$

wherein R represents $C_1$–$C_{18}$-alkyl; and X represents halogen, preferably chlorine.

4 Claims, No Drawings

POLYENE/α-OLEFIN COPOLYMERS

CROSS REFERENCE TO RELATED APPLICATION

This application is a continuation-in-part of application Ser. No. 142,899 filed Apr. 23, 1980 and now abandoned.

This invention relates to copolymers or graft copolymers of from 5 to 95% by weight of one or more α-olefins corresponding to the following general formula A:

  (A)

wherein $R^1$ represents alkyl having from 1 to 16 carbon atoms or phenyl; and from 5 to 95% by weight of straight-chain, branched-chain or crosslinked polyenes of the polybutadiene or polyisoprene type (B), wherein the molecular weight is from 100,000 to 1,000,000 and at least 90% of the links are 1,4 links.

The present invention further relates to a process for the preparation of copolymers or graft copolymers of one or more α-olefins corresponding to above general formula A with one or more polyenes (B), wherein one or more α-olefins A are reacted with a solid catalytic complex based on $TiCl_3$ and one or more aluminum compound(s) corresponding to the following general formula C:

  (C)

wherein
$R^2$ represents $C_1$–$C_{18}$ alkyl;
X represents halogen, preferably chlorine; and $0 < n \leq 3$;
in the presence of a solution of a polyene (B) in an inert solvent or of a gel of polyene (B) which has swelled in an inert solvent, and the final linkage between component (A) and component (B) is produced at the end of polymerization by the addition of a dihalogen aluminum alkyl corresponding to the following general formula D:

  (D)

wherein
R represents $C_1$–$C_{18}$ alkyl; and
X represents halogen, preferably chlorine;
and the formation of the linkage between (A) and (B) may be accelerated by the introduction of a component (E) comprising a mixture of a benzene halide compound, in particular benzyl bromide, and a trialkylphosphine compound, in particular tri-n-butyl-phosphine, into the polymer suspension before component (D) is added.

α-olefin polyene, e.g., butadiene or isoprene, copolymers and processes for the preparation thereof using Ziegler-Natta catalysts are known, but the known processes result either in copolymers having an elastomeric character which have a strictly alternating structure or in copolymers which contain only a small amount of diene component. These products may be crosslinked by vulcanization using sulphur. Since a peroxidic crosslinking of poly-α-olefins is generally not possible, this product has certain advantages.

German Offenlegungsschrift No. 2,706,118 describes a process for the preparation of strictly alternating copolymers of trans-1,4-butadiene units and propylene units by the solution polymerization of butadiene and propylene using vanadyl dialkoxy halides as catalysts. The products obtained have a sufficiently high molecular weight to allow the use thereof as synthetic rubbers.

Journal of Polymer Sci., Polymer Chemistry Edition, Vol. 10, 3027–3037 (1972) describes the preparation of ethylene/butadiene copolymers using $TiCl_4/R_3Al$ catalyst systems. In the case of that process, it is possible to control the copolymer composition and the monomer ratios; a butadiene/ethylene ratio of 4:1 results in strictly alternating copolymers. The copolymers contain small amounts of 1,4-cis configurated butadiene units.

Ethylene/butadiene copolymers having high molecular weights, linear structures and low butadiene contents, prepared using modified vanadium catalysts, are described in Makromol. Chem. 179, 2173–2185 (1978). The products containing from 1 to 5 mol % of butadiene have the typical X-ray crystallinity of polyethylene, with small variations of the structural parameters. They generally melt at about 132° C. and may be crosslinked using sulphur.

Makromol. Chem. 79, 161–169 (1964) describes crystalline ethylene/butadiene copolymers having sequences of ethylene units and strictly alternating ethylene/butadiene units, which may be prepared using vanadium compounds, organo-aluminum components and weak Lewis bases.

U.S. Pat. No. 3,494,983 polymerizes at least two monoolefins in the presence of a low molecular weight polymer of a conjugated olefin which has about 2 to about 8 vinyl groups per polymer molecule. Quite apparently, the vinyl groups in the diolefin polymer serve as a starting point of α-olefin polymer chains. As a consequence, the structure of the product is quite unlike the structure of the product produced by the instant process. No dihalogen aluminum alkyl compound is used to effect linking of a diene polymer and a polyolefin.

U.S. Pat. No. 3,953,542 grafts ethylene onto a polymer of a conjugated diene or a copolymer thereof with, e.g., styrene. Please note that this procedure specifies a catalyst which is made from titanium or vanadium bromide, an aluminum hydrocarbon and a carbonyl-containing compound. There is no dihalogen aluminum alkyl for linking the two polymer chains.

French Pat. No. 2,133,353 grafts olefins on amorphous 1,2-polybutadiene. Post-treatment with a dihalogen aluminum alkyl for linking the two polymer chains is not disclosed. Instead, linkage through unsaturated groups at the ends of side chains or even the main chain is relied on.

Polyene/poly-α-olefin copolymers having a structure consisting of sequences of polyene units and α-olefin units or graft copolymers have not yet been described. It is only copolymers having such a structure, however, which combine the typical properties of thermoplasts with the typical properties of elastomers, the separate phases being coupled by the chemical bonds. This behaviour is found, e.g., in styrene/butadiene-styrene block copolymers based on a linear structure.

According to the present invention, therefore, polyene/poly-α-olefin copolymers having the structure of block copolymers or graft copolymers are obtained from a polymerization catalyzed using Ziegler-Natta catalysts based on TiCl₃ and aluminum compounds by carrying out the polymerization in the presence of one or more polyene(s) having more than 90% 1,4-linkages which are dissolved or swelled in one or more inert solvent(s) and by adding one or more dihalogen aluminum compound(s) corresponding to above general formula (D) or mixtures of (D) and (E), e.g., benzyl chloride/tri-n-butylphosphine before inactivation of the catalyst, so that components (A) and (B) are linked together. The specific yield of homo-poly-α-olefin (determined in g of polymer/g of catalyst per hour per atmosphere) remains virtually unchanged.

Preferred polyenes (B) according to the present invention are polybutadienes, polyisoprenes, poly-2,3-dimethylbutadienes or polyhexadiene-(2,4), which may be straight-chain, branched-chain or slightly cross-linked and still capable of swelling and having more than 90% 1,4-linkages. The molecular weights thereof are from $10^5$ to $10^6$.

Examples of suitable α-olefins (A) include: propylene, butene-1, pentene-1, hexene-1, undecene-1, 4-methylpentene-1 and mixtures thereof.

The inert solvents for component (B) serve also as dispersing medium for polymerization. Suitable solvents include: aliphatic and cycloaliphatic hydrocarbons having from 5 to 18 carbon atoms, chlorinated hydrocarbons and aromatic compounds. Examples include: pentane, hexane, heptane, octane, decane, cyclohexane, methyl-cyclohexane, benzene, toluene, xylene, ethyl benzene, benzyl chloride and dichloroethane. Iso-octane and mixtures of iso-octane and toluene in proportions, by weight, of 1:1 are particularly suitable; the mixtures generally have a stronger swelling effect on polyenes (B) than iso-octane alone.

A solid catalytic complex based on TiCl₃, referred to as TiCl₃ complex, is also used as catalyst constituent. This is a product corresponding to the following general formula:

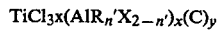
TiCl₃x(AlR$_n'$X$_{2-n'}$)$_x$(C)$_y$ wherein
R represents a hydrocarbon group having from 1 to 18 carbon atoms;
X represents halogen (e.g., chlorine);
n' represents a numerical value such that $0 \leq n' \leq 2$;
C represents a complex-forming agent;
x represents a number smaller than 0.3; and
y represents a number greater than 0.001.

Such products and the preparation thereof have been described in German Offenlegungsschrift No. 2,213,086.

TiCl₃ catalysts on a solid carrier based on anhydrous magnesium chlorides, such as those described in German Offenlegungsschrift No. 2,839,136 may also be used.

Suitable aluminum compounds include, e.g. triethylaluminum, triisopropyl-aluminum, tri-n-butyl-aluminum and partially halogenated aluminum compounds, such as ethyl-aluminum dichloride, diethyl-aluminum chloride, diethyl-aluminum bromide and diethyl-aluminum iodide. Diethyl-aluminum chloride is particularly advantageous.

Aluminum compounds corresponding to above general formula (D) suitable for the reaction linking components (A) and (B) may correspond to the aluminum compounds (C), but dihalogen compounds are particularly suitable, most preferred being ethyl-aluminum dichloride.

Polymerization may be carried out at temperatures of from 20° to 100° C., preferably from 60° to 90° C., and at partial pressures of the monomers of from 1 to 30 bar, the pressure being maintained by introducing further monomers into the process. The solid catalytic complex based on TiCl₃ may be used in a concentration of from 0.1 to 400 mmol per liter, preferably from 1 to 50 mmol per liter. The aluminum compounds corresponding to above general formula (C) are used as co-catalysts. The molar ratio of aluminum compound to TiCl₃ complex generally ranges from 1:1 to 100:1, preferably from 5:1 to 20:1, most preferably from 8:1 to 12:1.

When carrying out the polymerization reaction, the catalyst and co-catalyst may advantageously first be combined in ca. one tenth of the total amount of solvent in a vessel preceding the reaction vessel, the resulting suspension then being added to the remaining solvent containing component (B) preferably in solution.

The proportion, by weight, of polyene (B) to poly-α-olefin (A) may be from 5:95 to 95:5. Hydrogen may be added to regulate the molecular weight of component (A).

After initial polymerization, components (A) and (B) are linked by the addition of aluminum alkyl (D) generally at from 40° to 80° C., preferably from 50° to 60° C. The proportion, by weight, of (A)+(B) to (D) may be from 5:1 to 500:1, preferably from 50:1 to 100:1. The reaction time is generally from 1 to 3 hours. The speed with which the link between (A) and (B) is formed may be increased by adding a mixture of, e.g., benzyl chloride/tri-n-butylphosphine (E) generally in a molar ratio of 1:1 to the polymer suspension before component (D) is added. The molar ratio of (E):(D) is then generally from 1:10 to 1:50, preferably from 1:15 to 1:25.

After the linking reaction, the catalytic complex is inactivated, e.g., by the addition of one or more alcohols or an alcohol mixture.

The products according to the present invention do not have a significant gel content. An indication of the co-polymer composition may be obtained by fractionating the product into the following three parts (see Table below):

(I) insoluble in boiling xylene≡cross-linked components;
(II) insoluble in xylene at room temperature≡components having high poly-α-olefin content; and
(III) soluble in xylene at room temperature≡components having high polyene content.

An indication of the composition may also be obtained from the composition of the starting compound considered in conjunction with the results of fractionation of physical mixtures of (A) and (B) and from IR investigation of the fractions.

Alloys of homo-poly-α-olefins with the copolymers described are tougher and have better elastic properties than the corresponding pure polymers.

The present invention is illustrated by the following Examples. Percentages are always by weight.

EXAMPLE 1

A 2-liter glass autoclave was evacuated several times and then filled with argon. 25 g of a polybutadiene (made with a cobalt catalyst, ca. 98% 1,4-cis linkages; Mooney viscosity ML-4 (100° C.) ca.48) dissolved in 1500 ml of a 1:1, by weight, iso-octane/toluene mixture were introduced and 0.5 g=3.24 mMol of TiCl₃ complex (see DE-OS No. 2,901,646) was then contacted with 40 ml of a 20% solution of diethyl aluminum chloride in 50 ml of iso-octane in a reaction vessel preceding the autoclave and the resulting suspension was pumped into the autoclave. When the desired polymerization temperature of 70° C. was reached, propylene was passed through the suspension for one hour. At the end of the initial polymerization, a mixture of 1.48 ml=6 mMol of tri-n-butylphosphine and 0.71 ml=6 mMol of benzyl bromide were added to the suspension. Stirring was continued for one hour after the addition of 10 ml=97 mMol of dichloroethyl aluminum and the reaction mixture was stabilized using 0.1% of 2,6-ditertiary-butylphenol. An excess of a methanol/propanol mixture was added. 33 g of a copolymer having the composition shown in the Table below was obtained after drying in a high vacuum at 60° C.

COMPARISON EXAMPLE

The procedure was the same as in Example 1, except that the linking reaction between the as yet inactivated polypropylene and the polybutadiene in the reaction vessel was omitted. 37 g of product were obtained after the alcohol treatment and drying in a high vacuum at 60° C. Fractionation of this product into components (II) and (III) and the analytical investigation thereof indicated that the product consisted of a purely physical mixture of the components.

EXAMPLE 2

25 g of a polybutadiene rubber having the characteristic data shown in Example 1 were stirred with 0.5 g of dibenzoylperoxide in 750 ml of iso-octane for 3 hours at 92° C. The resulting cross-linked product contained 98% of a fraction which was insoluble in boiling xylene. After the addition of 750 ml of toluene, both propylene polymerization and the linking reaction described in Example 1 were carried out. 150 g of a copolymer which had a higher gel content than corresponds to the content of the products of cross-linked polybutadiene were obtained. This result indicated that polypropylene had been grafted on cross-linked polybutadiene.

Composition of polypropylene/polybutadiene copolymers or graft copolymers by fractionation (3 g of product/1000 ml of xylene)

The products were fractionated into 3 parts:
(I) insoluble in boiling xylene=cross-linked constituents;
(II) insoluble in xylene at room temperature=constituents containing predominantly polypropylene (PP);
(III) soluble in xylene at room temperature=constituents containing predominantly polybutadiene (PB);

| Example | Overall composition of the copolymer PB | PP | (I) (gel content %) | (II) (high PP content %) | (III) (high PB content %) |
|---|---|---|---|---|---|
| Comparison | 67.56 | 32.44 | — | 33 | 68 |
| 1 | 75.80 | 24.20 | 0.8 | 8.2 | 91.2 |
| 2 | 16.66 | 83.34 | — | 94 | 5.7 |

We claim:
1. A process for making a copolymer of from 5 to 95% by weight of a straight-chain, branch-chain or cross-linked, but solvent swellable, homopolymeric polyene and having at least 90% 1,4 linkages and from 5 to 95% by weight of an α-olefin of the formula

$$CH_2{=}CH \atop | \atop R^1$$

wherein
$R^1$ is alkyl having from 1 to 16 carbon atoms or phenyl, which comprises reacting at least one α-olefin of said formula with a solid catalytic complex of $TiCl_3$ and an aluminum compound of the formula $AlR^2{}_nX_{3-n}$ wherein
$R^2$ is $C_1-C_{10}$ alkyl,
X is halogen and $0<n\leq 3$ in the presence of a solution of said polyene in an inert solvent or in the presence of a gel of said polyene swelled in an inert solvent and producing a final linkage between resulting polyolefin and said polyene at the end of the polymerization by adding to the reaction mixture a dihalogen aluminum alkyl of the formula $X_2AlR^3$ wherein
$R^3$ is $C_1-C_{18}$ alkyl and
X is halogen.
2. The process of claim 1 wherein, in order to accelerate the formation of the linkage between said resulting polyolefin and said polyene, a mixture of benzene halide and trialkylphosphine is introduced into the reaction mixture before the addition of said dihalogen aluminum alkyl.
3. The process of claim 2 wherein said benzene halide is benzyl bromide and said trialkylphosphine is tri-n-butylphosphine.
4. The process of claim 1 wherein X in said aluminum compound and in said dihalogen aluminum alkyl is chlorine.

* * * * *